Sept. 14, 1937.	C. RIESEBECK	2,093,138
APPARATUS FOR FEEDING ARTICLES TO MACHINES
Filed April 8, 1933	15 Sheets-Sheet 1

Sept. 14, 1937.   C. RIESEBECK   2,093,138
APPARATUS FOR FEEDING ARTICLES TO MACHINES
Filed April 8, 1933   15 Sheets-Sheet 3

Inventor:
Curt Riesebeck

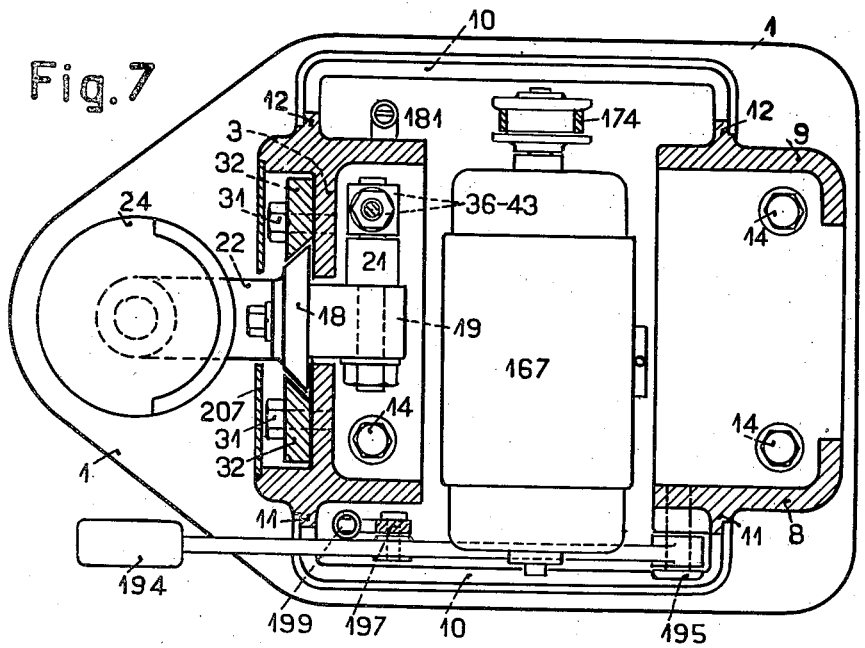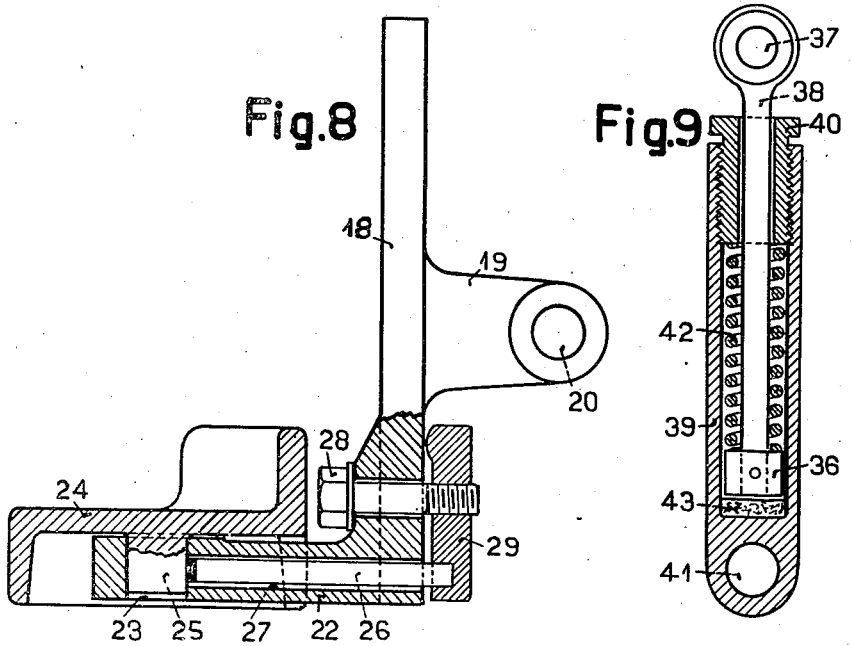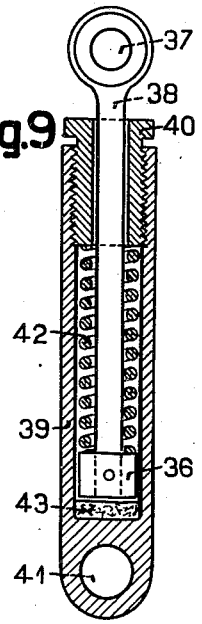

Sept. 14, 1937.  C. RIESEBECK  2,093,138
APPARATUS FOR FEEDING ARTICLES TO MACHINES
Filed April 8, 1933   15 Sheets-Sheet 7

Inventor:
Curt Riesebeck.

Sept. 14, 1937. C. RIESEBECK 2,093,138
APPARATUS FOR FEEDING ARTICLES TO MACHINES
Filed April 8, 1933 15 Sheets-Sheet 8
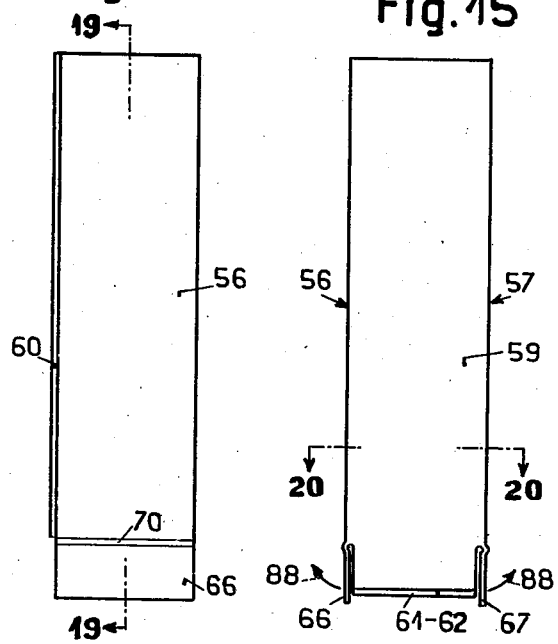
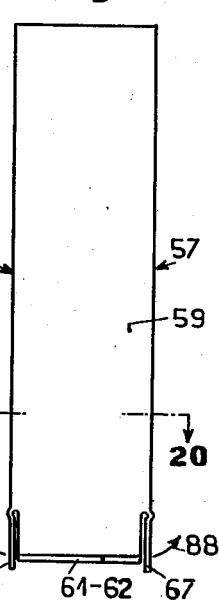
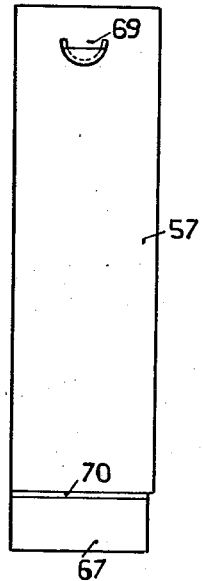
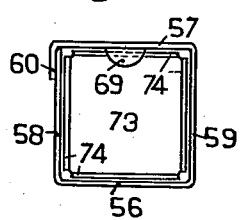
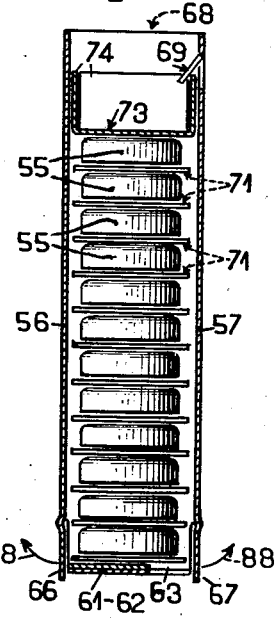
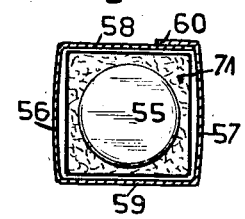
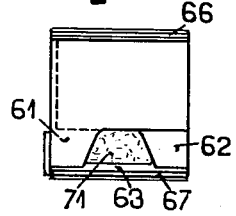

Sept. 14, 1937.  C. RIESEBECK  2,093,138
APPARATUS FOR FEEDING ARTICLES TO MACHINES
Filed April 8, 1933  15 Sheets-Sheet 9

Sept. 14, 1937.    C. RIESEBECK    2,093,138
APPARATUS FOR FEEDING ARTICLES TO MACHINES
Filed April 8, 1933    15 Sheets-Sheet 10

Inventor:
Curt Riesebeck

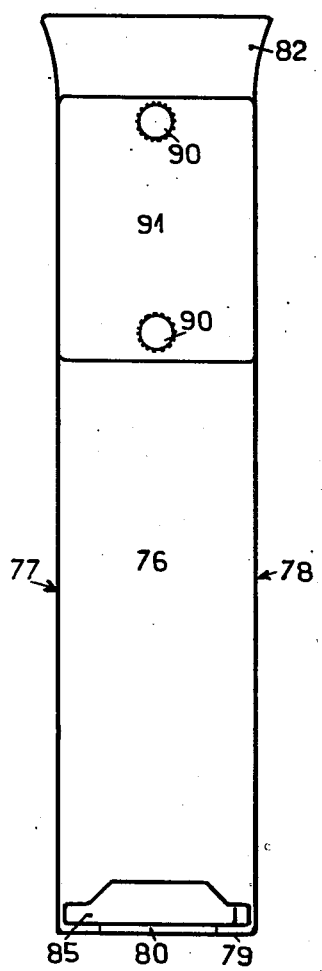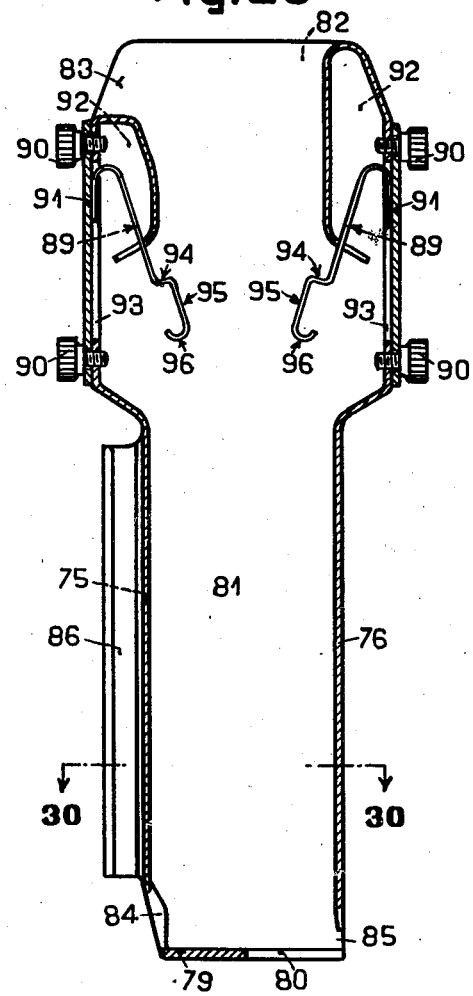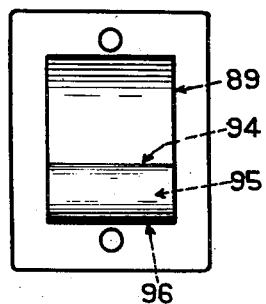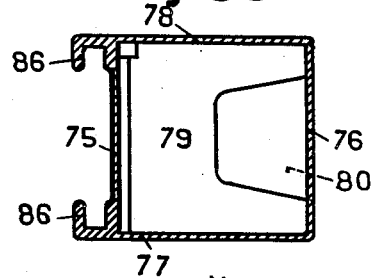

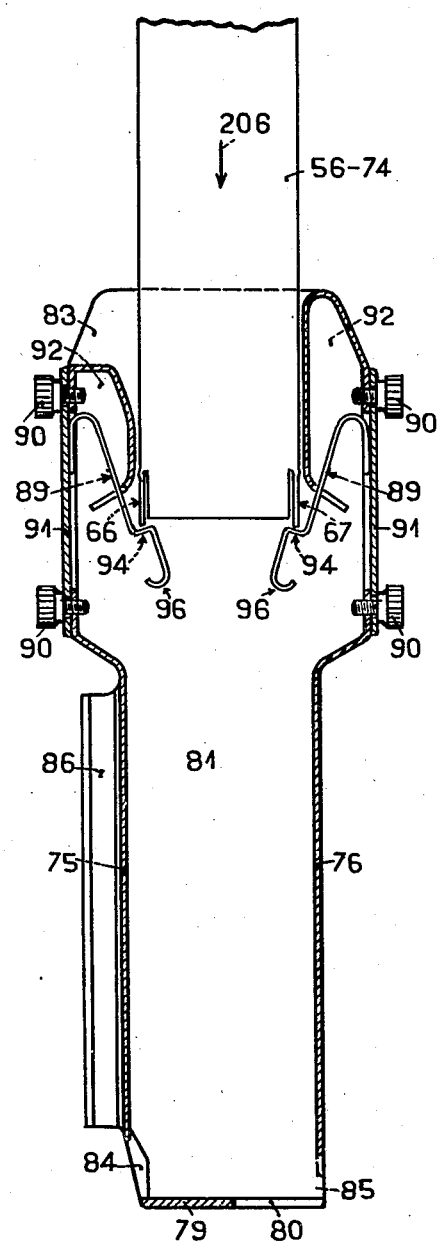
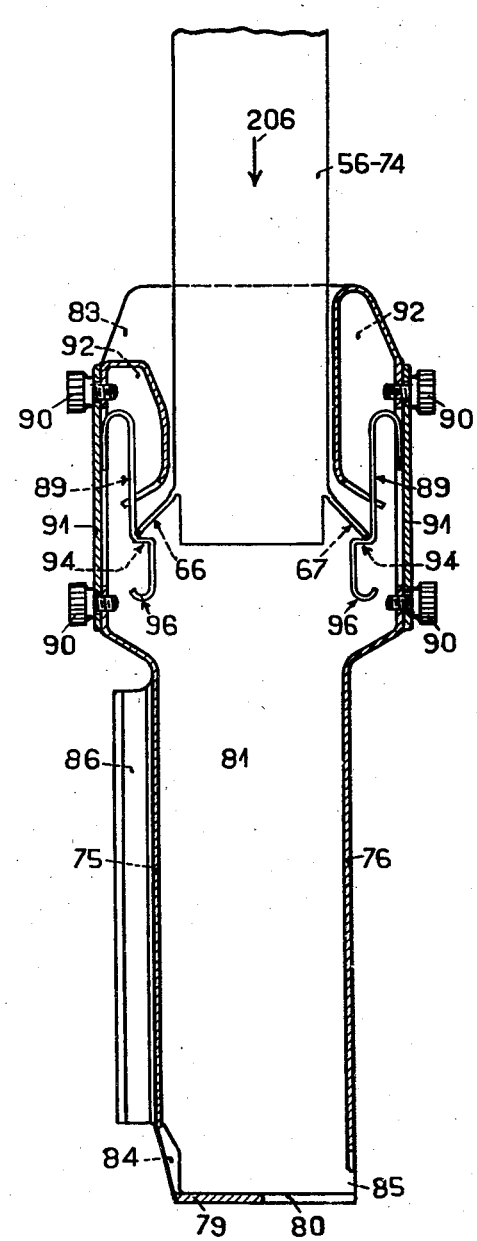

Sept. 14, 1937.   C. RIESEBECK   2,093,138
APPARATUS FOR FEEDING ARTICLES TO MACHINES
Filed April 8, 1933   15 Sheets-Sheet 13
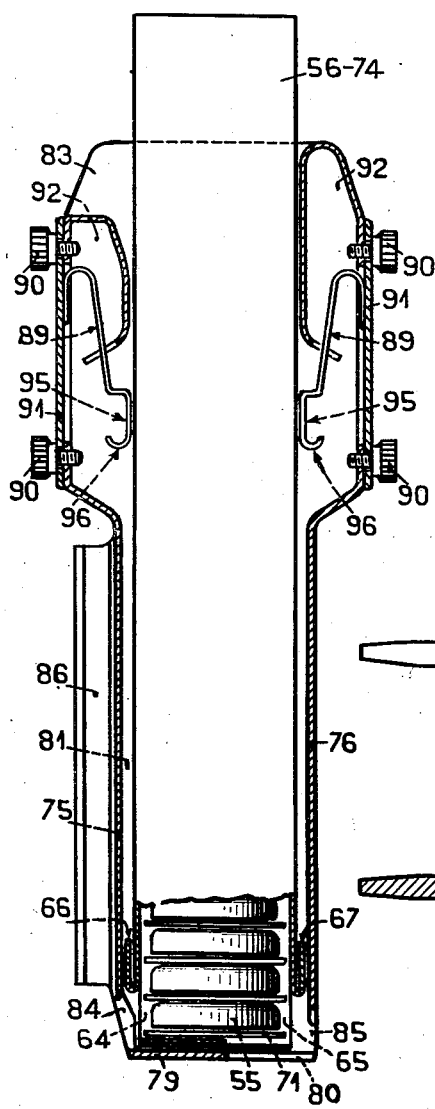
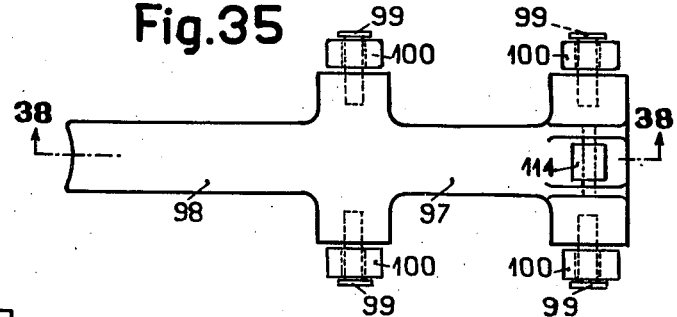
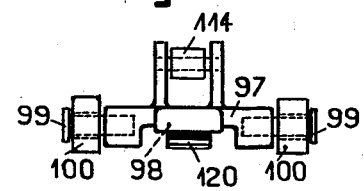
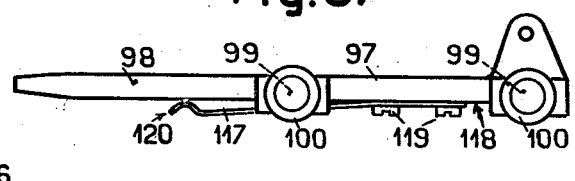
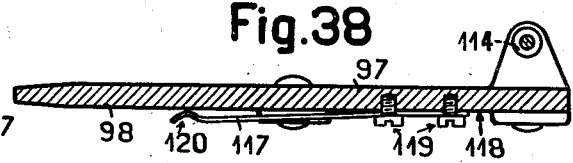
Inventor:

Sept. 14, 1937.     C. RIESEBECK     2,093,138
APPARATUS FOR FEEDING ARTICLES TO MACHINES
Filed April 8, 1933     15 Sheets-Sheet 14
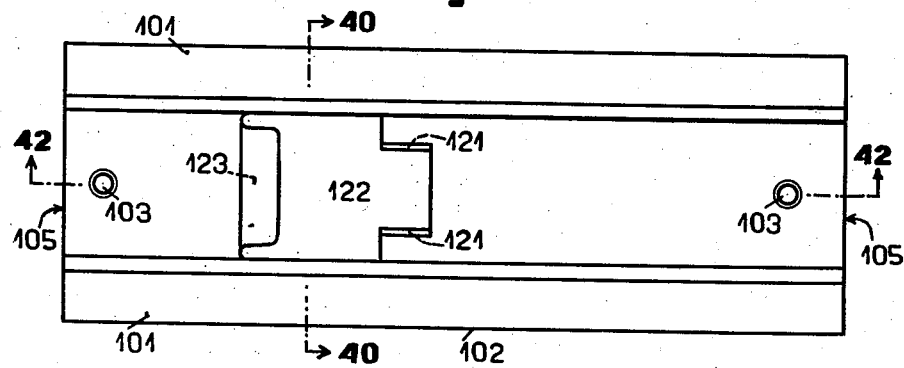
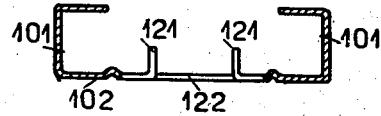
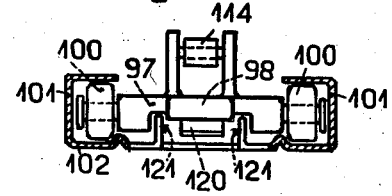
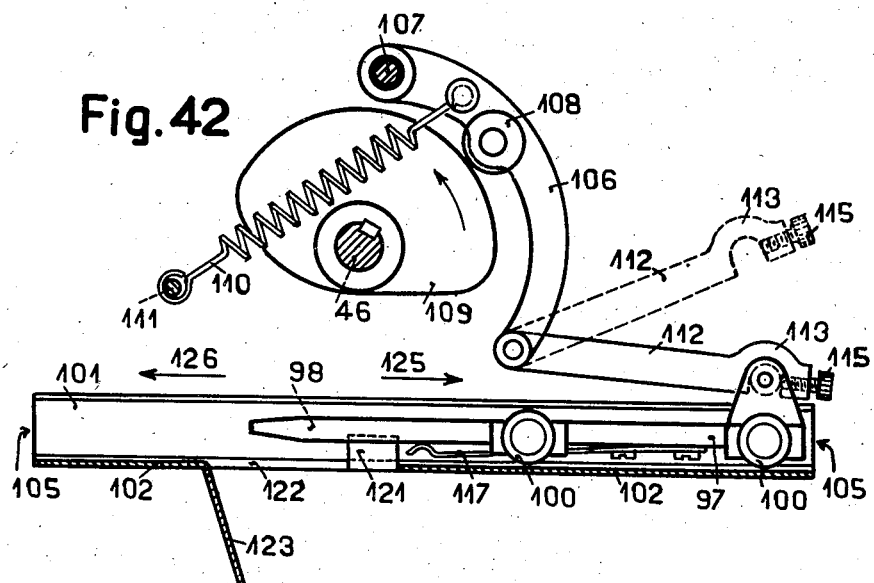

Sept. 14, 1937.    C. RIESEBECK    2,093,138
APPARATUS FOR FEEDING ARTICLES TO MACHINES
Filed April 8, 1933    15 Sheets-Sheet 15
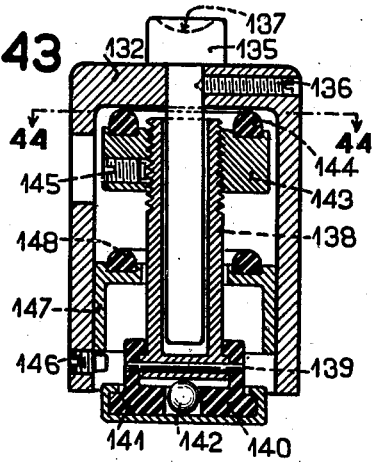
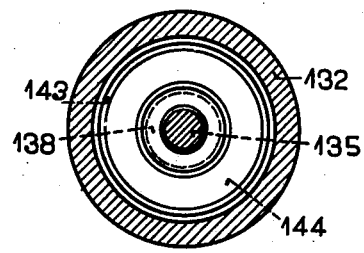
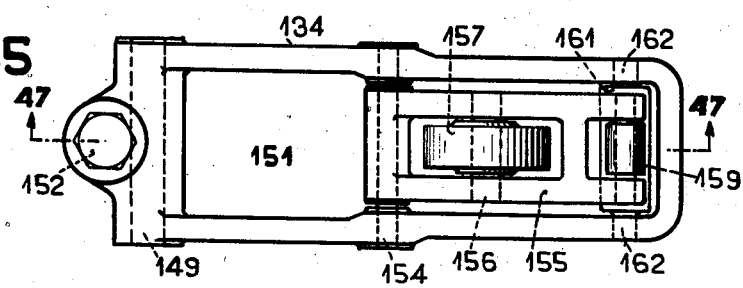
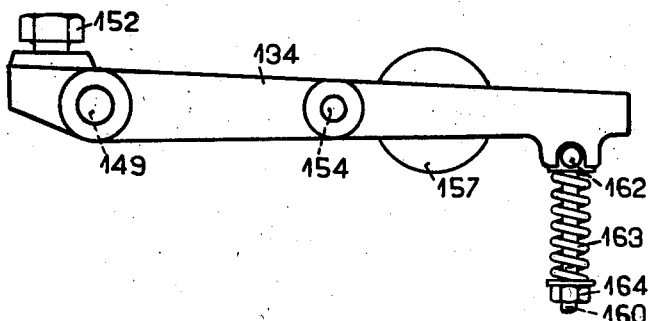
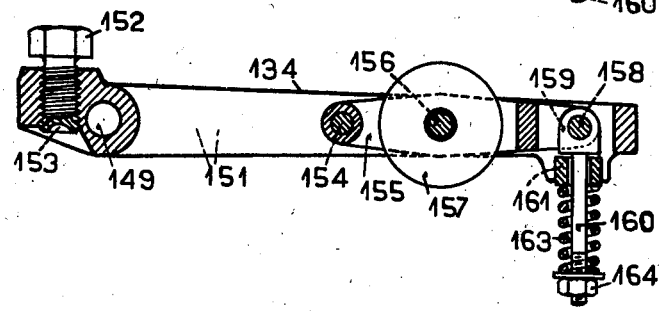
Inventor:

Patented Sept. 14, 1937

2,093,138

UNITED STATES PATENT OFFICE 2,093,138

APPARATUS FOR FEEDING ARTICLES TO MACHINES

Curt Riesebeck, Berlin-Friedenau, Germany

Application April 8, 1933, Serial No. 665,621
In Germany August 29, 1929

7 Claims. (Cl. 226—88.1)

I have filed an application for patent in Germany dated August 29, 1929.

My invention relates to apparatus for feeding articles to machines, and more particularly to apparatus for feeding closures of the crown cork type or caps of various kinds to the throat of capping machines.

An object of my invention is to provide an apparatus for feeding caps, possessing a novel cap feeding device and a novel magazine for said caps, of which the said magazine may be introduced or exchanged from the cap feeding device in a quick and hygienic manner, and having an easily exchangeable container, in which the caps piled one on top of the other are prevented through protective bodies from sticking, interlocking or deformation, while the cap feeding device is adapted to withdraw the said caps and protective bodies from the said container and separate them from one another, to convey the caps separately either to the cap applying device or throat of the capping machine and to convey the protective bodies to a collecting vessel arranged on the machine.

A further object of my invention is to provide an apparatus for effectively and economically feeding individual articles of various kinds, from a stack.

Other objects and advantages will be made manifest in the following description and accompanying drawings.

While my invention in general is applicable to feeding articles of various kinds, it is particularly adapted to feeding caps and it is here illustrated in combination with a bottle-capping machine.

My invention will be fully explained in the following description and the particular pertinent features of construction will be stated in the claims in connection with the accompanying drawings, which illustrate a preferable embodiment of my invention.

In the drawings

Figure 7 is a top view and horizontal section in agreement with line 7—7 in Figure 2.

Figure 8 is a side view and fractional section of the lifting carriage and bottle carrying tray.

Figure 9 is a vertical section through the elastic connection rod, pertaining to the bottle raising device.

Figure 14 is a front view of the cap magazine, the closing members of which are in the closed position, and which contains the caps and protective bodies.

Figure 15 is a side view of the same.

Figure 16 is a rear view of the same.

Figure 17 is a plan view of the same.

Figure 18 is a bottom view of the same, and

Figure 19 is a vertical section according to line 19—19 in Figure 14.

Figure 20 is a horizontal section according to line 20—20 in Figure 15.

Figure 21 is a plan of the protective body.

Figure 26:
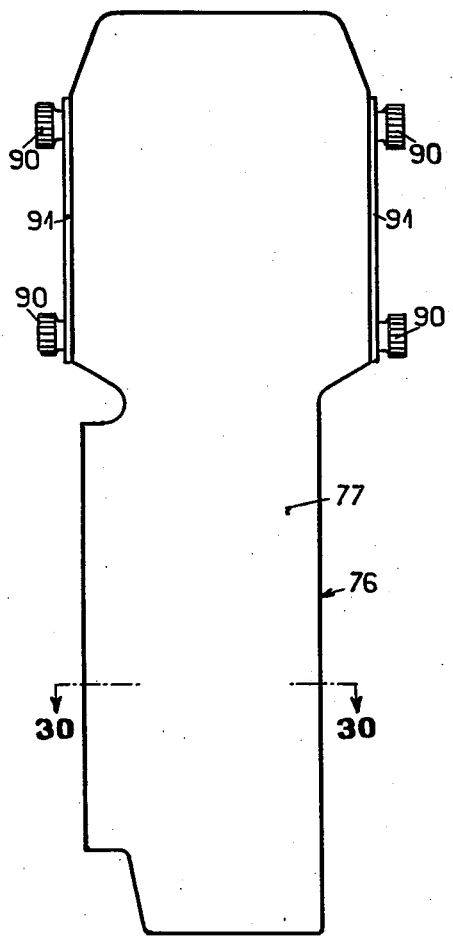
Figure 26 is a side view of the holding device and the opening and closing devices, which serve for the holding, opening and closing of the cap magazine.
Figure 27:
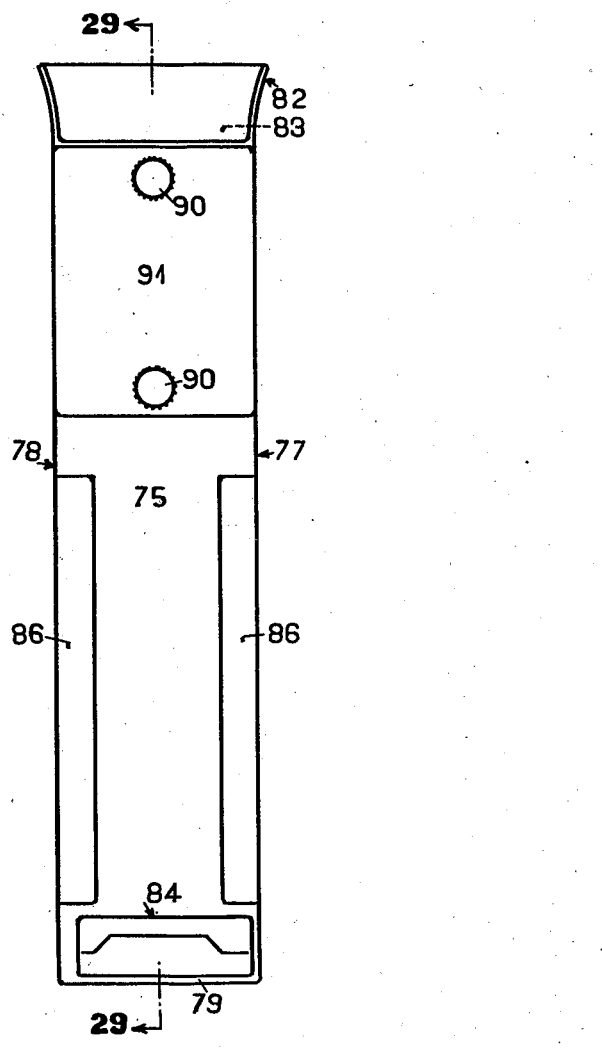

Figure 27 is a front view of the same.
Figure 28 is a rear view of the same.
Figure 29 is a vertical section according to line 29—29 in Figure 27.
Figure 30 is a horizontal section according to line 30—30 in Figures 26 and 29.
Figure 31 is a front view of the turning device which is secured to a holding plate, belonging to the opening and closing device.
Figures 32 to 34 represent a vertical section of the holding device and the opening and closing device in cooperation with the cap magazine represented in side elevation; Figure 32 showing the closed cap magazine, Figure 33 showing the cap magazine during the opening operation, opened halfway; and Figure 34 showing the cap magazine partly opened, in section.
Figure 35 is a plan of the cap feeding slide, carrying on its lower side a catch, serving for the removal of protective bodies from the cap magazine.
Figure 36 is a front view thereof.
Figure 37 is a longitudinal view thereof, and Figure 38 is a longitudinal section thereof according to line 38—38 in Figure 35.
Figure 39 is a plan of the guide, on which the cap feeding slide is reciprocated.
Figure 40 is a cross-section of the same according to line 40—40 in Figure 39.
Figure 41 is a cross-section according to line 40—40 in Figure 39 and a front view of the cap feeding slide arranged in the guide.
Figure 42 is a longitudinal section according to line 42—42 in Figure 39 and a longitudinal view of the cap feeding slide and the controlling mechanism serving for the reciprocation of said slide.
Figure 43 is a vertical section of the plunger serving for actuating the cap pressure ring, and
Figure 44 is a horizontal section of the same in conformity with line 44—44 in Figure 43.
Figure 45 shows in plan the pressure lever, belonging to the cap depressing device, actuating its pressure plunger.
Figure 46 is a longitudinal view thereof, and
Figure 47 is a longitudinal section thereof according to line 47—47 in Figure 45.

The bottle-capping machine serves for applying and securing caps or seals to bottles, milk-bottles, cans and the like, it is easily portable and can be readily operated upon a table or any other suitable place and it comprises a casing and arranged upon this latter a bottle lifting device, a removable cap applying device, a cap feeding device and a cap depressing device, which are operated in common through a driving arrangement, possessing an electric motor for electrical operation and a removable crank for manual drive. The said caps or capsules may be such as outer caps, inner caps, crown corks, closing caps, tearing caps of aluminium and the like.

The casing of the machine

The casing possesses a base plate 1, upon which are provided four feet 2 of noise-reducing material like rubber, felt and the like, and to which is secured by means of screws 14 a box-like main casing 3—13, comprising a front wall 3, a case-like extension 4 fixed to the latter, a rear wall 5, two recesses 6, 7 in the rear wall 5 and two opposite side walls 8, 9. The base plate 1 possesses two ledges 10, 10, the side walls 8 two ledges 11, 11 and the side wall 9 two ledges 12, 12, all serving for the attachment of two U-shaped guards 13, 13 of sheet-metal. The main casing 3—13 is open at the top, being closed by means of a removable lid 15.

The bottle lifting device

The bottle lifting device serves the purpose, to receive the bottle 16 to be sealed and to guide the head 17 of the latter into the bottle guiding channel 53 of the cap applying device 47—54, to guide it into the hollow space of the cap pressure ring 129 and thence into the initial position. The bottle lifting device contains a lifting carriage 18, having an attaching arm 19 with a boring 20 as well as a carrying bolt 21 secured to the former and being further provided with a carrying arm 22, arranged at the lower end of the lifting carriage 18, possessing a vertical boring 23 and having secured to it a bottle carrying tray 24 with attaching pin 25 and easily exchangeable by means of a releasable attaching device. This latter possesses a clamping bolt 26, displaceably arranged within a boring 27 in the carrying arm 22 and pressed through a screw-bolt 28, situated on the lifting carriage 18, and through a pressure lever 29 against the attaching pin 25 of the bottle carrying tray 24. The lifting carriage 18 is arranged to be displaced vertically on a carriage guide 30 provided on the front wall 3, said guiding means comprising adjustable guide-plates 32 secured by means of screws 31 and protected by a guard 207 of sheet metal. During each sealing operation the lifting carriage 18 is moved elastically up and down through a two-armed controlling lever 33—34, mounted upon a shaft 35 arranged in the main casing 3—13, and whose arm 33 is connected in an articulate manner with the lifting carriage 18 through an elastic connecting rod 36—43. The elastic connecting rod has a bar 38 provided with a plunger 36 and a boring 37, which bar is linked to the arm 33 and which is displaceably guided in a guiding cylinder 39 as well as in a screw-sleeve 40 mounted on the latter, the said guiding cylinder 39 having a boring 41, by means of which it is pivoted on the carrying bolt 21. On the rod 38 is mounted a compression spring 42, which abuts against the screw-sleeve 40 and the plunger 36, forcing the bar 38 and the plunger 36 against a felt plate 43 arranged within the guiding cylinder 39 and supporting it elastically in respect of the said guiding cylinder 39. The controlling lever 33—34 abuts with an idler 44 mounted on its arm 34 against a cam disc 45, seated upon the cam shaft 46 journalled in the main casing 3—13 and which will actuate the controlling lever 33—34 at each revolution, moving thereby the lifting carriage up and down.

The cap applying device

The cap applying device 47—54 (see Figures 1, 2, 5, 6, 10–14) serves for mounting a cap 55 on the head 17 of the bottle 16 to be sealed and possesses a moulded piece 47, which is secured easily removably upon the flange 48 of the extension 4 of the casing by means of two pin screws 49, which are attached to the moulded piece 47 and extend through holes 50 of the flange 48, securing the moulded piece 47 to the flange 48 through screw-nuts 51. The moulded piece 47 has a seating face 52, a vertical bottle guiding channel 53 flaring towards its lower end, and a groove-like cap admission channel 54, opening laterally into the said bottle guiding channel 53, being freely accessible from the top and through which the cap 55 to be applied passes into the said bottle guiding channel 53, in which the cap 55 is retained, until the head 17 of the bottle to be sealed is introduced into the same.

The cap feeding device

The cap feeding device supplies the cap applying device 47—54 with the caps 55 required for sealing the bottles and it has an exchangeable cap magazine, a holding device for said magazine, an opening and closing device for said magazine, a controlled cap feeding slide and a separating device.

Figure 22:
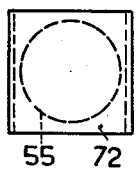
Figure 22 shows a modified form of a protective body, surrounding a cap, in plan.
Figure 24:
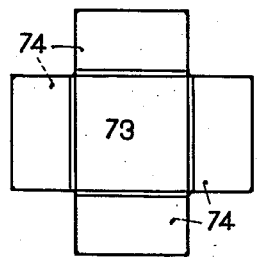
Figure 24 shows in plan the pattern of the closure, from which the closing member of the magazine is produced, which is arranged within the cap container of the magazine.
Figure 23:
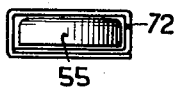
Figure 23 is a front elevation of the same.
Figure 25:
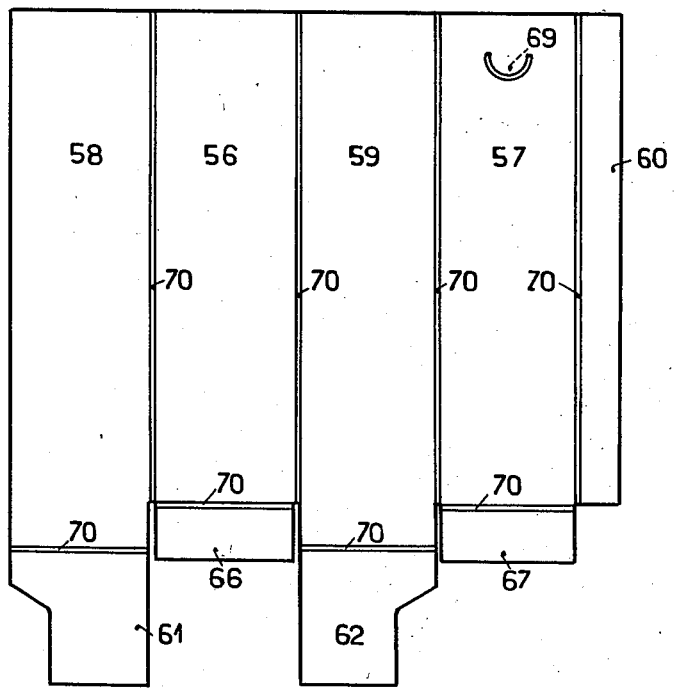
Figure 25 shows in plan the pattern of the cap container from which the cap container of the magazine is made.

The exchangeable cap magazine has a cap container 56—70, in which caps 55 and protective bodies 71 are stacked up alternatively one on top of the other in large numbers, which are all kept in the container 56—70 through the magazine closure 73—74. The container 56—70 has a front wall 56, a rear wall 57, two side walls 58, 59, an attaching strip 60, a bottom consisting of two parts 61, 62 and a recess 63 in said bottom, which are all arranged rectangularly to each other. Besides, the container 56—70 possesses a cap discharge opening 64 (see Figure 34) and a discharge opening 65 for the protective bodies, of which the cap discharging opening 64 is arranged below the front wall 56, permitting the caps 55 to be removed laterally from the container 56—70 individually, while the discharge opening 65 for the protective bodies is arranged below the rear wall 57, permitting said protective bodies 71 to be removed laterally from the container 56—70 individually. On the front wall 56 above the cap discharge opening 64 is provided a movable flap-like closing member 66, closing the cap discharge opening in its closing position, as shown in Figures 14 to 20, while in its open position it will not close the cap discharge opening 64, as illustrated in Figure 34. On the rear wall 57 above the discharge opening 65 for the protective bodies there is provided a movable flap-like closing member 67, which in its closing position will close the discharge opening 65 for the protective bodies, as shown in Figures 14 to 20, while in its open position it will not close the discharge opening 65 for the protective bodies, as represented in Figure 34. The upper end of the container 56—70 is provided with a charging opening 68, through which the caps 55 and protective bodies 71 are filled into the cap container, and which is closed by means of the magazine closure 73—74, displaceably arranged in the cap container and securely locked against removal from the cap container by means of a locking member 69 arranged on the rear wall 57. Preferably the cap container is made of one piece from a pattern 56—70 consisting of impregnated card-board, or paste-board, paper, sheet-metal and the like, and contains all parts 56—69 of the cap container as well as folding lines 70 grooved or cut between these, and is manufactured and worked upon known machines like known folding box patterns. Each protective body 71 is preferably plate-like and of rectangular form and made of impregnated card-board, paste-board, paper, sheet-metal or the like, and placed upon each of the caps 55 stacked up one on top of the other within the cap container 56—70. These protective bodies prevent the sticking together, interlocking and touching of the caps 55 piled one on top of the other within the cap container and serve besides for the stiffening or reinforcement of the whole cap container 56—70. Each protective body 71 may also be of a modified form, as shown in Figures 22 and 23, in which the said protective body consists of a ring 72, made of paper, card-board, sheet metal and the like, surrounding the cap 55 to be protected and preventing said caps from sticking together, interlocking or touching each other in the container, similar to the protective body 71. The magazine closure 73—74 is arranged displaceably in the cap container 56—70 and made of a pattern, consisting of impregnated card-board, paste-board, paper, sheet-metal and the like, and it possesses a bottom 73 as well as four spreading walls 74 connected therewith, which are bent upwards in respect of said bottom 73 and which resiliently abut against the walls 56—59 of the cap container as shown in Figure 19. Preferably each cap magazine is being used only once and destroyed after the consumption of the caps contained therein.

The holding device serves for holding the cap magazine 56—74, admits of an easy and quick insertion and exchange of the magazine 56—74 exchangeably arranged in said holding device, and for the purpose of easy cleaning and inspection it is removably arranged on the main casing 3—13. The holding device possesses the form of a container and has a front wall 75, a rear wall 76, two side walls 77, 78, a bottom 79, a recess 80 in the bottom 79, a holding space 81 for the cap magazine 56—74 and a funnel 82, having a lateral opening 83, through which funnel the said cap magazine 56—74 may be readily and quickly introduced into the holding space 81. At the lower end of the front wall 75 is located a discharge opening 84, through which only the bottommost cap 55 (Figures 6 and 34) of the cap magazine 56—74 situated in the holding space 81 may be passed each time, and the rear wall 76 has at its lower end a discharge opening 85, through which only the bottommost protective body 71 may be passed each time from said cap magazine. For releasable attachment of the holding device to the main casing 3—13, there are provided two holding ledges 86 on the front wall 75, by means of which the holding device is raised along a vertical holding rod 87 (Figure 6) secured to the main casing 3—13, and held in such position. The holding device is arranged with its discharge opening 84 directly in front of the cap admission channel 54 of the cap applying device 47—54, permitting of the withdrawal of the lowermost cap 55 from the cap magazine 56—74, contained in the holding device, and to pass said cap laterally into the cap admission channel 54 of the removable cap applying device 47—54.

Figure 6:
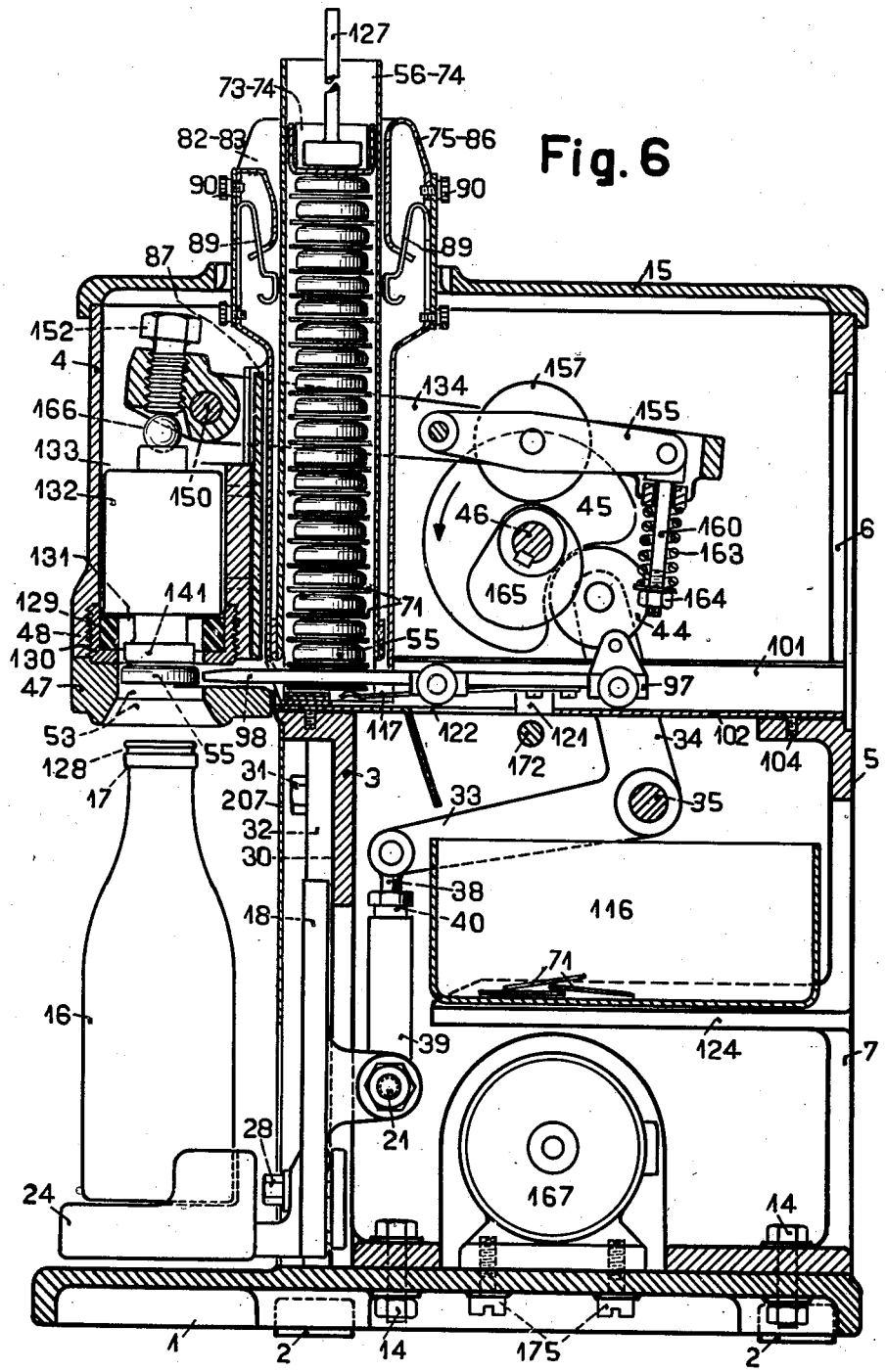
Figure 6 is a vertical section of the bottle-capping machine along line 6—6 in Figure 1.
Figure 10:
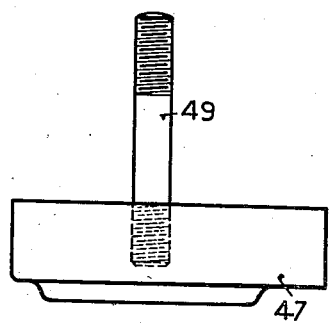
Figure 10 is a side view of the dismountable cap applying device.
Figure 12:
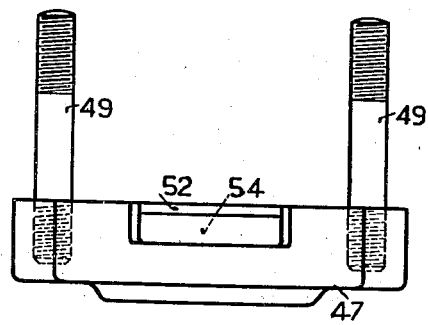
Figure 12 is a rear view of the same.
Figure 11:
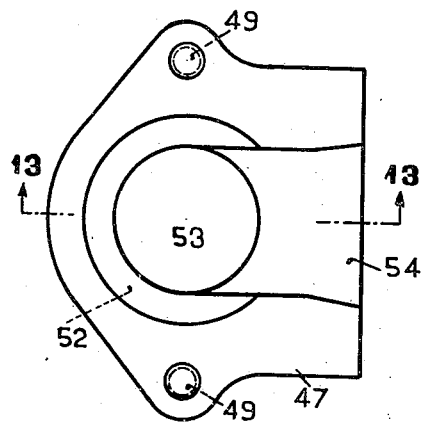
Figure 11 is a plan view of the same.
Figure 13:
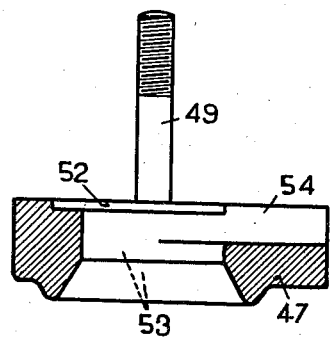
Figure 13 is a longitudinal section of the same along line 13—13 in Figure 11.

The opening and closing device serves the purpose to turn up the closing elements 66, 67 of the cap magazine 56—74 in the direction of the arrow 88 during the introduction of the cap magazine 56—74 into the holding device and to maintain said elements in the open position (Figures 6 and 34), whereupon the removal of caps 55 and protective bodies 71 from said cap magazine may take place. In addition the opening and closing arrangement serves the purpose to turn down the closing elements 66, 67 of the cap magazine 56—74 contained in the holding device, into the closing position during the withdrawal of the magazine from the holding device, whereby the cap magazine is closed, while the latter may be again employed for the hygienic storage of the caps still contained therein. The opening and closing device is arranged on the holding device and contains two turning elements 89 for turning up and down the closing elements 66, 67 of the cap magazine. Each turning element 89 is attached to a holding plates 91, removably secured to the holding device 75—86 by means of screws 90, and arranged within a chamber 92, open towards the holding space 81 provided in the holding device, and it can be removed for the purpose of cleaning or inspection through a recess 93, provided in the holding device. Each turning element 89 is made of a piece of spring metal and is resilient and possesses at its lower free end an upper ledge 94, an abutting ledge 95 and a lower ledge 96, which all extend into the holding space 81. The mode of operation of the opening and closing device is as follows: While introducing a cap magazine 56—74 into the funnel 82 of the holding device (Figure 32) in the direction of the arrow 206 the closing elements 66, 67 of the cap magazine will at first reach the upper ledges 94 of the two turning elements 89, forcing them from the holding space 81 into the chambers 92 (Figure 33), while simultaneously the closing elements 66, 67 are turned upwards, being maintained in the open position thus attained even, if the cap magazine 56—74 is further advanced into the holding space 81. While pushing the cap magazine 56—74 further into the holding space 81, the turning members 89 will resiliently engage with their abutting ledges 95 the front wall 56 and the rear wall 57 of the cap magazine, securely clamping the latter in this position, so that caps 55 and protective bodies 71 may be withdrawn from the said cap magazine 56—74, as illustrated in Figures 6 and 34. When the said cap magazine is pulled out from the holding space 81 the closing elements 66, 67 reach the chambers 92 and swing into these latter and will thus engage the lower ledges 96 of the turning elements 89 from below and while the cap magazine is pulled out further from the holding space 81, they are again turned down into the closed position.

The cap feeding slide 97 serves the purpose to withdraw the caps 55 individually from the cap magazine 56—74 contained in the holding device 75—86, for passing the caps laterally directly into the cap admission channel 54 and the bottle guiding channel 53 and for holding the said cap 55 in the bottle guiding channel 53, until the bottle 16 to be sealed, has been introduced with its head 17 into said cap 55. The cap feeding slide 97 has a feeding arm 98 and four bearing bolts 99, upon which guiding rollers 100 are mounted, by means of which the cap feeding slide 97 is displaceably guided on a guide 102 provided with two guiding rails 101 of U-shaped profile. The guide 102 has screw-holes 103 and is secured to the main casing 3—13 by means of screws 104; it carries the holding device 75—86 and is freely accessible from the front and rear ends 105, after the cap applying device 47—54 has been removed from the casing 3—13. For the control of the cap feeding slide 97 serves a controlling lever 106, pivotally secured to the main casing 3—13 by means of a bearing bolt 107, which by means of a roller 108 mounted thereon, is forced by means of a draw-spring 110 against a cam disc 109, arranged on the cam shaft 46, which spring is linked to the latter and a bearing bolt 111, secured to the main casing 3—13. To the lower extremity of the controlling lever 106 is linked a coupling rod 112, having a hook-shaped head 113 and being attached by means of the latter to a sleeve 114 mounted on the cap feeding slide 97 as well as by a screw 115 arranged upon the head 113. As soon as the coupling rod 112 is detached from the revoluble sleeve 114 and turned upwards, as shown in Figure 42 in broken lines, it is possible to easily withdraw the so detached cap feeding slide 97 from the guiding rails 101.

The separating device serves the purpose to withdraw each time the lowermost protective body 71 from the cap magazine 56—74 contained in the holding device 75—86, and to drop it into a collecting vessel 116. The separating device comprises a catch 117, formed as a leaf spring and secured to the lower side 118 of the cap feeding slide 97 by means of screws 119, and has provided at its free extremity a clamping nose 120 resiliently engaging the feeding arm 98. The guide 102 is provided with two stripping devices 121, an opening 122 and a guiding member 123, which are all made of sheet metal and integral with the guide 102. Below the guide 102 is arranged the collecting vessel 116 made of sheet metal and resting upon ledges 124 of the main casing 3—13 and adapted to be withdrawn. The mode of operation of the cap feeding slide 97 and separating device is as follows: In the initial position the cap feeding slide 97 and its feeding arm 98 lie in the cap admission channel 54 of the cap applying device 47—54. During each cap applying operation the cap feeding slide 97 as well as the catch 117 is moved once backward in the direction of the arrow 125, and once forward in the direction of the arrow 126.

During the forward movement in the direction of the arrow 125 the feeding arm 98 is moved through the discharge opening 85 of the holding device 75—86, pushing thereby from the cap magazine 56—74 supported by the holding device 75—86 the bottommost cap 55 laterally through the discharge opening 84, laterally directly into the cap admission channel 54 and bottle guiding channel 53, and subsequently it resiliently engages the said cap 55, maintaining the latter horizontally in the bottle guiding channel, until it has been applied to a bottle 16 to be sealed. At the same time, the lowermost protective body 71 contained in said cap magazine 56—74 is clamped each time between the clamping nose 120 of the catch 117 and the feeding arm 98 during the advance of the cap feeding slide 97 and the catch 117. During the return movement of the cap feeding slide 97 and catch 117 in the direction of the arrow 126 the feeding arm 98 is removed from the cap admission channel 54, the cap magazine 56—74 and the holding device 75—86, whereby the protective body 71 clamped to the catch 117 is carried along, stripped from the catch 117 through the stripping members 121 and dropped into the collecting vessel 116 through the opening 122. At the same time all caps 55 and protective bodies 71 contained in said cap magazine 56—74 as well as the magazine closure 73—74 will during the return movement of the cap feeding slide 97 and the catch 117 in the direction of the arrow 126, slide by virtue of the weight 127 placed upon the magazine closure, downwards in front of the feeding arm 98, when the removal of a fresh cap 55 and a fresh protective body 71 from the cap magazine 56—74 can again take place.

The cap pressing device

The cap pressing device serves the purpose of firmly pressing the cap 55 contained in the bottle guiding channel 53 after the application of said cap to the head 17 of the bottle 16 and securing it to the groove 128 provided on the head of the bottle. The cap pressing device possesses a pressure ring 129 of rubber, arranged in a holding ring 130 screwed into the flange 48, while the head 17 of the bottle provided with a cap is introduced in known manner into the inner space 131 of said ring. During each pressing operation the pressure ring 129 is being vertically depressed through a pressure plunger 132, guided within a cylindrical boring 133 provided in the extension 4 of the casing, and actuated through a controlled pressure lever 134. To the compression plunger 132 is secured a guiding bolt 135 by means of a screw 136, and having a bearing pan 137 and upon which a guiding sleeve 138 is displaceably arranged, which carries on its lower end an elastic holding ring 140 of rubber secured by means of a pin 139 to the former, upon which is seated a metal compression cap 141. The holding ring 140 made of soft rubber encircles ring-like a metal ball 142, leaning on the one hand against the lower end of the guiding sleeve 138 and carrying on the other hand the metal compression cap 141, and which is supported by the holding ring 140 made of soft rubber and permitted to universally oscillate during the introduction of the head 17 of a bottle provided with a cap 55 into the inner space 131 of the pressure ring 129, said cap 55 being axially forced against said bottle-head 17. A ring 143 threaded upon the guiding sleeve 138, having an annular rubber-buffer 144 and secured in its position through a screw 145, will limit the upward movement of the compression cap 141, and a ring 147 secured to the compression plunger 132 by means of a screw 146 and provided with an annular rubber-buffer 148, will limit the downward movement of the compression cap 141. The controlled pressure lever 134 is mounted with a boring 149 upon a shaft 150 journalled in the extension 4 of the casing, it has an opening 151 for the passage of the holding device 75—86, an adjustable screw-bolt 152 with bearing pan 153 and a bearing bolt 154, upon which a swinging member 155 is arranged. The latter possesses a shaft 156, a pressure roller 157 mounted upon said shaft 156 and a screw bolt 159 linked to it by means of a pin 158, which bolt is guided with its shank 160 in a traverse 161, which is mounted on the pressure lever 134 by means of pins 162. On the shank 160 is arranged a compression spring 163, which engages the traverse 161 through a tension nut 164, so that the swinging member 155 is under spring tension in respect of the pressure lever 134, while the pressure roller 157 is resiliently mounted. The pressure lever 134 by means of the pressure roller 157 will engage a curved disc 165, secured to the controlling shaft 46 and moving the pressure lever up and down at each revolution, which lever will suitably actuate the compression plunger 132 through a pressure ball 166 mounted on the bearing pans 137 and 153.

*The driving device*

The driving device comprises an electric motor 167, which will run without any interruption during the successive cap applying operations, and a coupling device, which must be actuated by hand during each sealing operation, and which causes a revolution of the controlling shaft, whereby all devices of the machine are operated periodically. A gear 168 is pivoted on the cam shaft 46, said gear having a coupling rim 169 with several recesses 170 and engaging a pinion 171, which is secured to the driving shaft 172 carried by the main casing 3—13. The driving shaft 172 is moved by means of a pulley 173 mounted thereon and by a belt 174 through the electric motor 167, which is secured to the bed-plate 1 by screws 175, and which can be connected and disconnected by means of a switch 176 and can be connected with a supply main through a cable 178 provided with a plug 177. The tension of the belt 174 is obtained through a tension roller 179, mounted upon a lever 180 on the main casing 3—13, which lever is subjected to spring-tension through the draw-spring 181. The coupling device possesses a hub 182 seated upon the controlling shaft 46 and having two arms 183 and 184, and a coupling pawl 186 linked to the arm 183 by means of bolts 185. The said coupling pawl 186 is kept under spring tension through the draw-spring 187 and it is automatically engaged with its coupling tooth 188 in a recess 170 of the gear 168 during each cap applying operation, and it is automatically withdrawn again from said recess 170 after the controlling shaft 46 has executed a total revolution.

Figure 1:
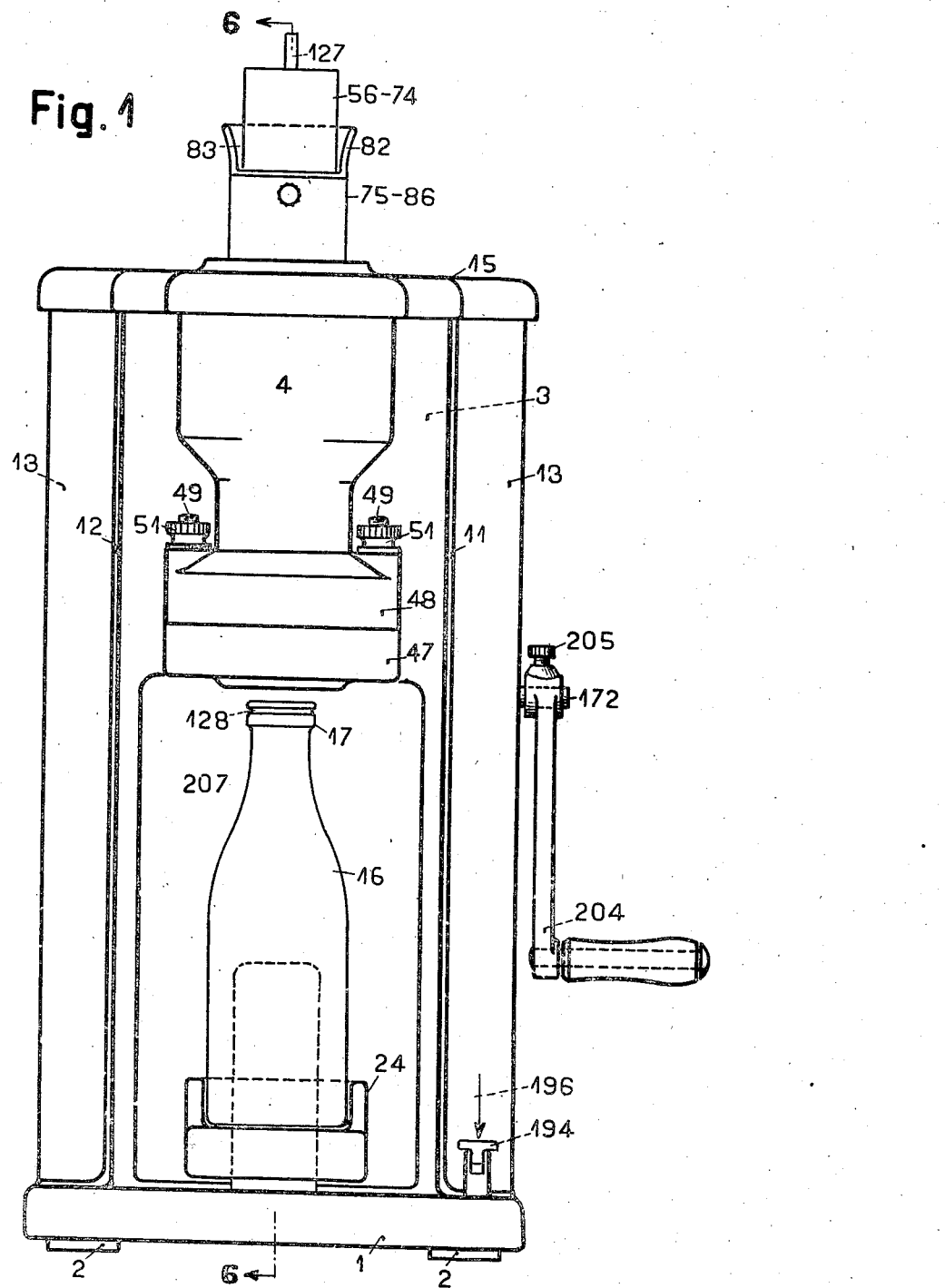
Figure 1 represents a front view of a machine for attaching caps to bottles, which is constructed in agreement with the principle of my invention and which is adapted for manual and electrical operation.
Figure 2:
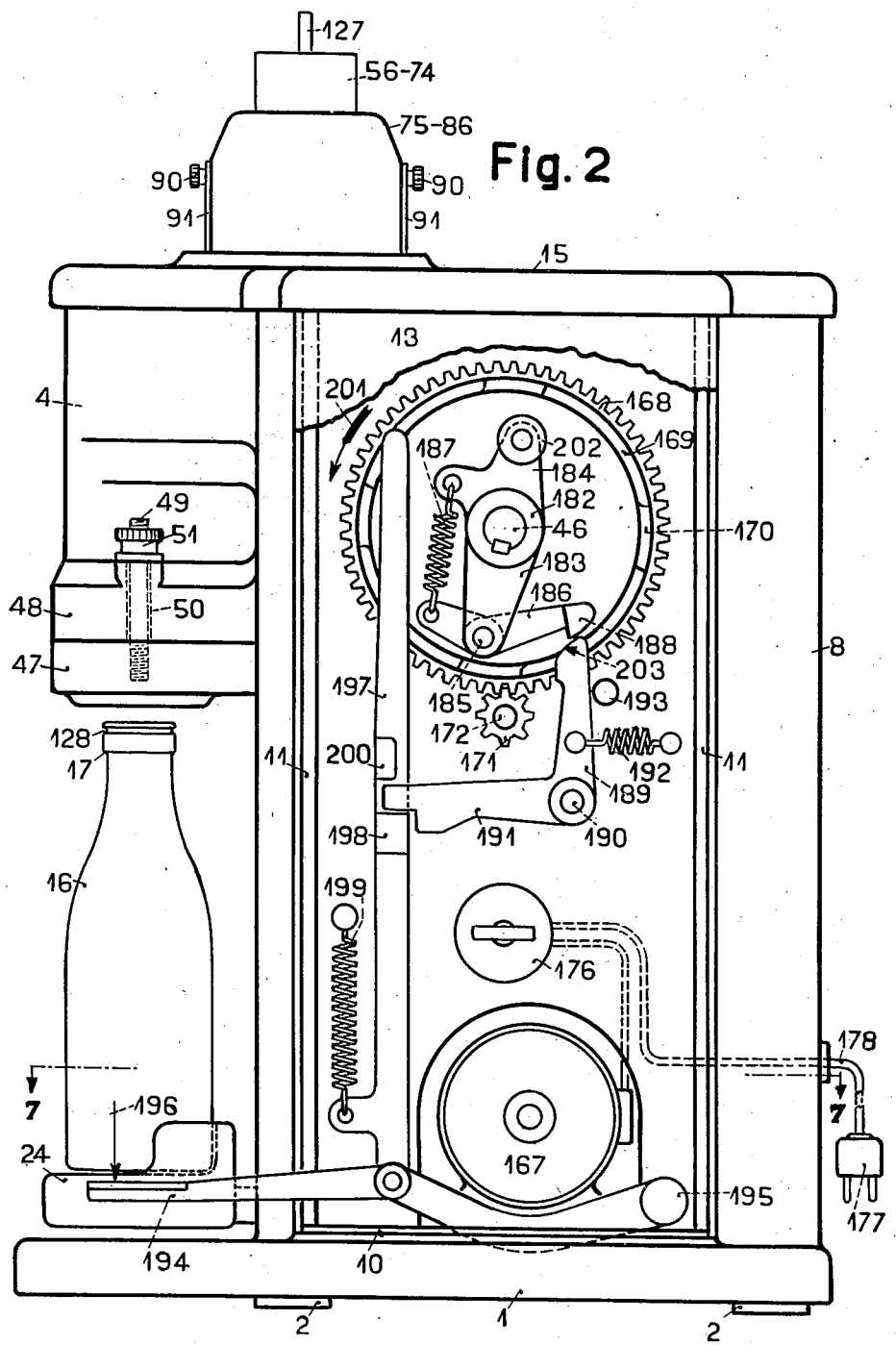
Figure 2 is a side elevation of the bottle-capping machine, in which the crank for manual operation is not illustrated, while the lateral guard is shown in fraction, the coupling pertaining to the driving mechanism being shown in its disengaged position while the operating pawl, rod and key are shown in the position of rest.
Figure 3:
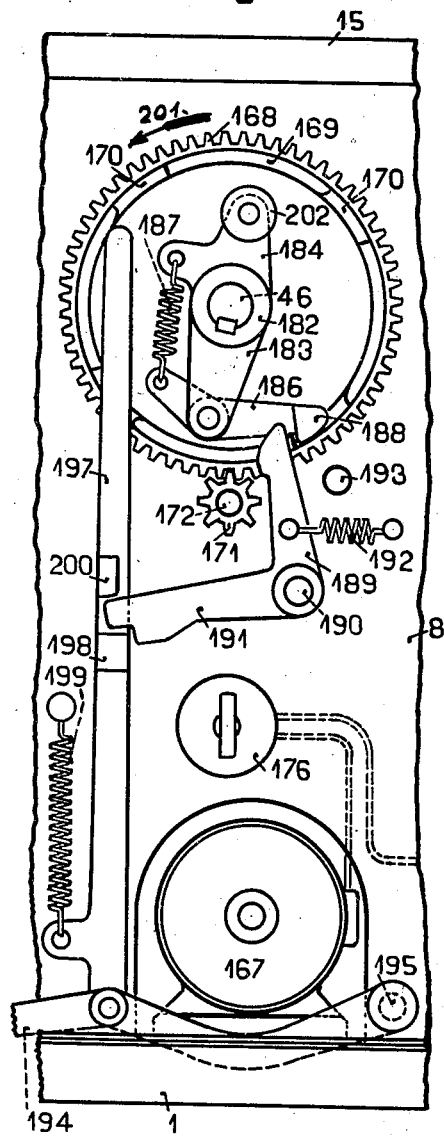
Figure 3 shows in fraction the side view of the bottle-capping machine, in which the coupling is illustrated in the position of engagement and the operating pawl, rod and key in the operative position.
Figure 4:
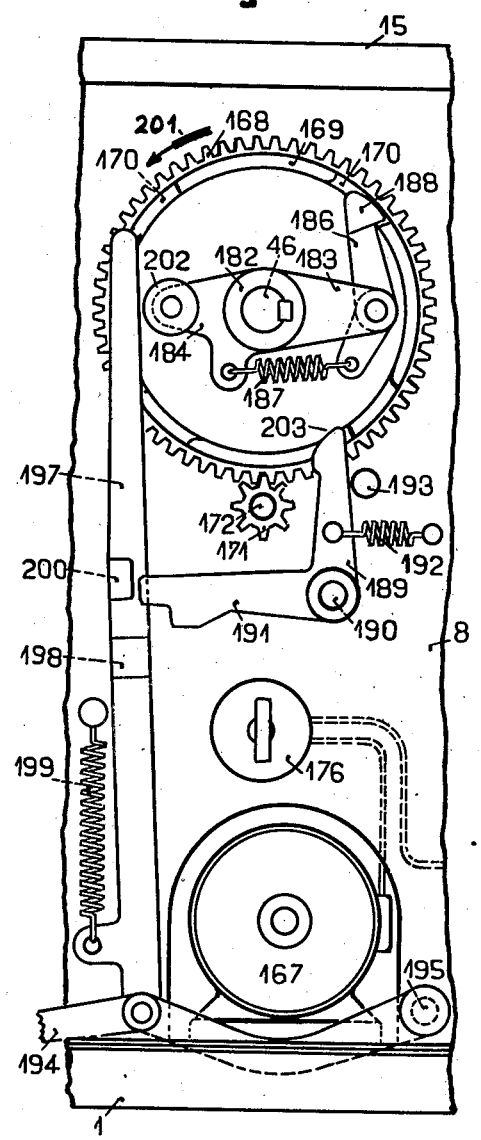
Figure 4 shows in fraction the side view of the bottle-capping machine, in which the coupling is represented in the position of engagement and the operating pawl and rod in their inoperative position and the operating key in operative position.
Figure 5:
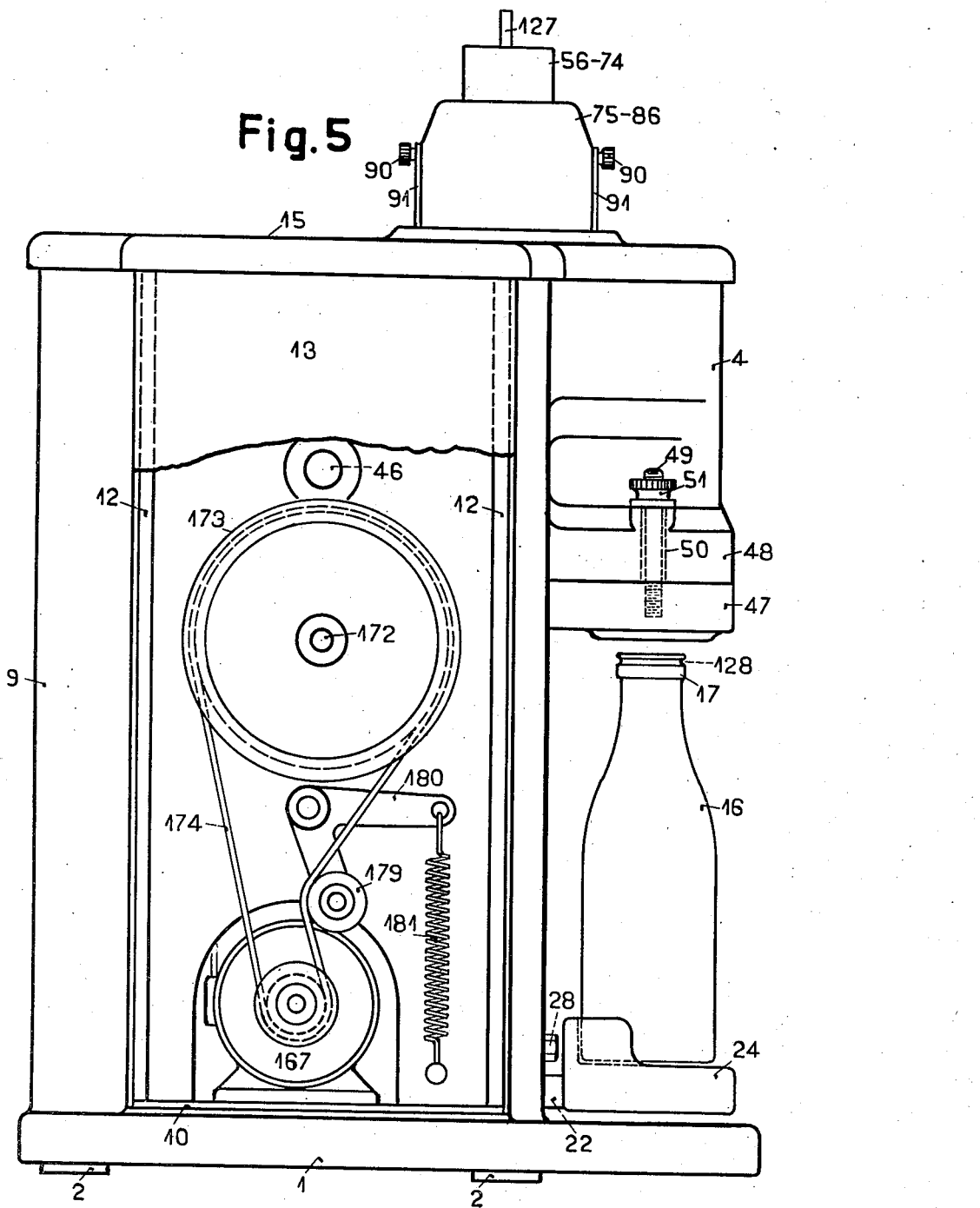
Figure 5 is another side view of the bottle-capping machine.

For automatically engaging and disengaging the coupling pawl 186 serves a pawl 189, which is mounted on a bolt 190 secured to the wall 8 of the casing, and has a controlling arm 191 and is maintained in its inoperative position through a draw-spring 192, forcing it against a stop 193 provided on the wall 8 of the casing, as shown in Figures 2 and 4. At each sealing operation the pawl 189 is transferred from its inoperative position into its operative position, as shown in Figure 3, through a lever 194, pivoted on a bolt 195 secured to the wall 8 of the casing, and which lever can be depressed in the direction of the arrow 196 by a slight pressure of the finger, a bar 197 being linked to said lever, which is forced with its lower stop 198 into its inoperative position through a draw-spring 199 linked to the wall 8 of the casing and to the lever 194, from below and laterally against the controlling arm 191 of the pawl 189. When depressing the lever 194 in the direction of the arrow 196 the bar 197 will abut with its upper stop 200 against the controlling arm 191, moving the latter downwards, whereby the pawl 189 will be shifted from the normal position shown in Fig. 2 to the engaging position shown in Fig. 3 and the pawl 186 will be moved by the spring 187 so that its tooth 188 will engage in a recess 170 of the coupling rim 169 of the rotating gear 168, which latter will turn the cam shaft 46 in the direction of the arrow 201 (Fig. 2). Before the cam shaft 46 has executed a total revolution, the arm 184 together with the roller 202 provided thereon and mounted on said shaft will meet the upper end of the bar 197 (Fig. 4) and force the latter sideways until its upper stop 200 slips from the controlling arm 191, whereupon the pawl 189 will be shifted automatically from the operative into its inoperative position. Shortly prior to the completion of a total revolution of the cam shaft 46 the coupling pawl 186 with its coupling tooth 188 will slide on the curved member 203 of the pawl 189, disengaging thereby the coupling pawl 186 and its coupling tooth 188 from the recess 170 of the coupling rim 169, so that the cam shaft 46 will come to a standstill after one revolution through the resistance of motion of the cam discs 45, 109, and 165. For the purpose of manipulating the machine by hand a crank 204 is provided on the driving shaft 172 fixed thereon by means of set-screw 205, and said crank is removed from the shaft 172, if it is desired to drive the apparatus by the electric motor 167.

I claim:

1. An exchangeable container for apparatus for feeding articles, designed to accommodate articles and protective bodies arranged in piles one on top of the other, of which one protective body each is arranged on one of said articles, having a front wall, a rear wall, two side walls, a bottom, a recess in said bottom, an article charging opening, an article discharging opening laterally arranged below the said front wall, a discharge opening for the protective bodies arranged laterally below the said rear wall, a movable closing member for closing the said article discharging opening, a movable closing member for closing the said discharge opening for the protective bodies, and a closure for the container, which is displaceably arranged within the article container and having a bottom and spreading members provided thereon and adapted to retain said articles and protective bodies in the container.

2. An exchangeable container for apparatus for feeding articles, designed to accommodate articles and protective bodies arranged in piles one on top of the other, of which one protective body each is arranged on one of said articles, said container formed from a single blank and having a front wall, a rear wall, two side walls, a bottom, a charging opening for the articles, a discharging opening for the articles, a discharging opening for the protective bodies and closing elements for closing the said discharging openings for the articles and protective bodies, substantially as described.

3. In an apparatus for feeding articles, and in combination, an exchangeable container adapted to accommodate articles arranged in piles one on top of the other and having discharge openings permitting of the removal of said articles and having movable closing elements for closing said discharge openings, a holding device, in which said container is removably arranged; and an opening and a closing device, adapted to bring the said closing elements of the said container automatically into the open position, when said container is introduced into the said holding device, and adapted to bring said closing elements automatically into the closed position, when said container is being withdrawn from the said holding device.

4. In an apparatus for feeding articles, and in combination, a container designed to accommodate articles and protective bodies arranged in piles one on top of the other, of which one protective body each is arranged on one of said articles; a holding device, in which said container is exchangeably arranged; a feeding slide adapted to remove said articles from said container; a catch arranged on the said feeding slide and adapted to successively seize and convey said protective bodies; a collecting vessel, removably arranged on the casing of the apparatus; means for reciprocating said feeding slide and catch; means for removing the said protective body from said catch; and means for directing said protective body into said collecting vessel, substantially as described.

5. The combination with an apparatus for feeding articles comprising a suitable frame, a magazine mounted on the frame, and an exchangeable container in said magazine adapted to hold the articles to be fed in a vertical pile with protective bodies between and separating said articles, said container having discharge openings at its lower end, and a reciprocable feeding slide adapted to eject an article from said container at each movement of the slide in one direction, said slide having a catch adapted to seize a protective body during each such movement and to withdraw it from the container on the reverse movement of the slide, and means for stripping said protective bodies from the catch.

6. The combination with an apparatus for feeding articles comprising a suitable frame, a horizontally reciprocable feeding slide, and a magazine mounted on the frame and projecting above the slide, of an exchangeable container in said magazine adapted to hold the articles to be fed arranged one upon the other in a vertical pile, said container being insertable into the magazine through the upper end thereof and said container having discharge openings in opposite sides at its lower end and having parts for closing said openings, and means in the magazine for moving said parts to uncover the discharge openings when the container is inserted in the magazine and for moving said parts to cover said discharge openings when the container is being withdrawn from the magazine.

7. The combination with an apparatus for feeding articles comprising a suitable frame, a horizontally reciprocable feeding slide, and a magazine mounted on the frame and projecting above the slide, of an exchangeable container in said magazine adapted to hold the articles to be fed arranged one upon the other in a vertical pile, with protective bodies between and separating said articles, said container having discharge openings in opposite sides at its lower end through which said slide is movable, said slide adapted to eject an article during each movement in one direction and having a catch adapted to remove a protective body during each movement of the slide in the reverse direction.

CURT RIESEBECK.